Patented June 12, 1934

1,962,226

UNITED STATES PATENT OFFICE 1,962,226

AZO DYES, AND METHOD FOR THEIR PREPARATION

Harold Edward Woodward, Penns Grove, N. J., assignor to E. I. du Pont de Nemours & Company, Wilmington, Del., a corporation of Delaware No Drawing. Application June 9, 1932, Serial No. 616,367

10 Claims. (Cl. 260—87)

This invention relates to azo dyes and more particularly refers to a yellow azo dye having the following general formula:

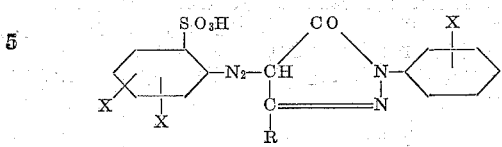

in which X is a radical selected from the group consisting of alkyl, alkoxy, halogen, and hydrogen; and R is an alkyl group.

It is an object of this invention to produce azo dyes which are especially adapted for coloring rubber. A further object is to produce azo dyes which may be used for dyeing textile materials and coloring printing inks and paints. Additional objects will appear hereinafter.

These objects are attained by the process of the present invention wherein a diazotized amino-benzene-mono-sulfonic acid, in which the sulfonic acid group is in ortho position to the amino group, is coupled to a phenyl-alkyl-pyrazolone.

The invention will be more completely understood by a consideration of the following examples:

Example 1

222 grams of 2-chlor-5-toluidine-4-sulfonic acid was dissolved in 3.5 liters water with 40 grams of sodium hydroxide at 70°. This hot solution was allowed to flow into 1 liter of 2.5 normal hydrochloric acid with sufficient ice to keep the temperature below 10° C. A 20% solution of 69 grams of sodium nitrite was added to form the insoluble 2 - chlor-toluene-5-diazonium-4-sulfonate. This was added to a solution of 184 grams of 1-phenyl-3-methyl-5-pyrazolone and 42 grams of sodium hydroxide and 106 grams of sodium carbonate in 3 liters of water. The temperature was kept below 10° C. during the addition of the diazo. After the coupling was complete the charge was heated for an hour at 95° C. to convert the insoluble color into a crystalline form. It was then filtered and washed. The filter cake had a dry content of about 420 grams.

Excellent results were also obtained by substituting for the first component in the above example, 2-chloro-4-toluidine-5-sulfonic acid.

Example 2

The sodium salt of the color prepared from 173 grams or ortho-sulfanilic acid and 184 grams of 1-phenyl-3-methyl-5-pyrazolone was stirred in 10 liters of water at 50° C. for one hour, and 250 grams of barium chloride crystals, dissolved in 1 liter of water, was added with good agitation. After stirring one hour more, the barium salt was filtered and washed.

In practicing the process of the present invention various intermediates may be used in place of those mentioned in the above examples. For instance, in place of the first component, numerous other amino-benzene-ortho-sulfonic acids may be substituted, such as para-toluidine-meta-sulfonic acid, 3-chloro-aniline-6-sulfonic acid, 4-chloro-aniline-6-sulfonic acid, and m-4-xylidine-5-sulfonic acid.

Likewise, numerous phenyl-alkyl-pyrazolones may be substituted for the second component. Among those compounds which may be substituted with very good results are 1-ortho-tolyl-3-methyl-5-pyrazolone and 1-para-fluor-phenyl-3-methyl-5-pyrazolone.

Where a very insoluble product is desired the barium salt of the compound prepared by the process of the present invention may be used. Such compound is especially desirable for coloring rubber, since this material is usually subjected to conditions wherein a water soluble salt would enter into solution. For dyeing textile materials the more soluble sodium salt may be used.

The dyes produced herein give exceptionally satisfactory results when used as a coloring for rubber, since they have excellent tinctorial value, are fast to light, do not migrate into white rubber and do not bleed into water. They are also very well adapted for use in coloring printing ink and paints since they impart a brilliant color of exceptional fastness. When used as a dye for textile materials they produce beautiful colors of good fastness to washing and light.

As many apparently widely different embodiments of this invention may be made without departing from the spirit and scope thereof, it is to be understood that I do not limit myself to the specific embodiments thereof except as defined in the appended claims.

I claim:

1. A process for producing an azo dye which comprises coupling a diazotized amino-benzene-mono-sulfonic acid, wherein the sulfonic acid group is in ortho position to the amino group, to a phenyl-alkyl-pyrazolone, the phenyl nucleus of which may have substituted thereon members selected from the group consisting of alkyl, alkoxy, and halogen.

2. A process for producing an azo dye which comprises coupling a diazotized amino-benzenemono-sulfonic acid, wherein the sulfonic acid group is in ortho position to the amino group, to a 1-phenyl-3-methyl-5-pyrazolone, the phenyl nucleus of which may have substituted thereon members selected from the group consisting of alkyl, alkoxy, and halogen.

3. A process for producing an azo dye which comprises coupling a diazotized amino-benzene-sulfonic acid of the following general formula:

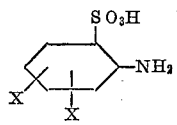

to a phenyl-alkyl-pyrazolone of the following general formula:

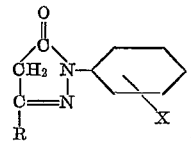

in which compounds X is a radical selected from the group consisting of alkyl, alkoxy, halogen, and hydrogen, and R is an alkyl group.

4. A process for producing an azo dye which comprises coupling a diazotized amino-benzene-sulfonic acid of the following general formula:

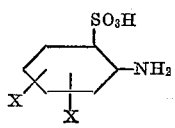

to a phenyl-alkyl-pyrazolone of the following general formula:

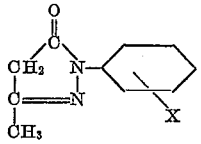

in which compounds X is a radical selected from the group consisting of alkyl, alkoxy, halogen and hydrogen.

5. A process for producing an azo dye which comprises coupling a diazotized amino-benzene-ortho-sulfonic acid of the following general formula:

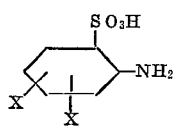

to a phenyl-methyl-pyrazolone of the following general formula:

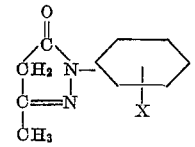

in which compounds X represents a hydrogen, methyl or halogen group.

6. A process for producing an azo dye which comprises coupling diazotized 2-chlor-5-toluidine-4-sulfonic acid to 1-phenyl-3-methyl-5-pyrazolone.

7. An azo dye having the following general formula:

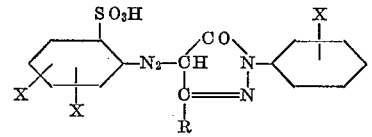

in which X is a radical selected from the group consisting of alkyl, alkoxy, halogen, and hydrogen, and R is an alkyl group.

8. An azo dye having the following general formula:

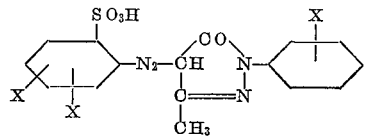

in which X is a radical selected from the group consisting of alkyl, alkoxy, halogen and hydrogen.

9. An azo dye having the following general formula:

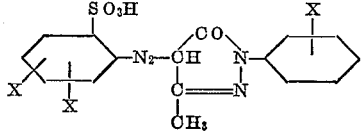

in which X represents a hydrogen, methyl or halogen group.

10. An azo dye having the following formula:

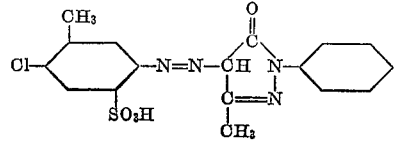

HAROLD E. WOODWARD.